United States Patent [19]
Oda

[11] Patent Number: 5,642,450
[45] Date of Patent: Jun. 24, 1997

[54] OPTICAL CONNECTOR OPTICAL ADAPTER AND LIGHT EMITTING MODULE

[75] Inventor: Gan Oda, Kawasaki, Japan

[73] Assignee: Fujitsu Limited, Kanagawa, Japan

[21] Appl. No.: 563,466

[22] Filed: Nov. 28, 1995

[30] Foreign Application Priority Data

Mar. 6, 1995 [JP] Japan .................................. 7-045128

[51] Int. Cl.$^6$ .................................................. G02B 6/38
[52] U.S. Cl. .................. 385/60; 385/72; 385/78; 385/88
[58] Field of Search ......................... 385/60, 72, 78, 385/88–94

[56] References Cited

U.S. PATENT DOCUMENTS 5,136,681  8/1992  Takahashi .................. 385/60
5,170,452  12/1992  Ott .......................... 385/72 X
5,434,941  7/1995  Bechtel et al. .............. 385/94

*Primary Examiner*—Phan T. H. Palmer
*Attorney, Agent, or Firm*—Helfgott & Karos, P.C.

[57] ABSTRACT

An optical connector which can prevent that light reflected on an end surface of a ferrule built in the optical connector may be returned to a transmitting side in the open condition of the connector. The optical connector includes a first ferrule and a second ferrule both slidably stored in a housing. The first ferrule has one end spherically polished and another end obliquely polished. The second ferrule has one end obliquely polished. The optical connector further includes a sleeve for coaxially holding the first ferrule and the second ferrule, a first spring for biasing the first and second ferrules away from each other, and a second spring for biasing the second ferrule toward the first ferrule. The first spring has a spring constant greater than that of the second spring.

8 Claims, 8 Drawing Sheets

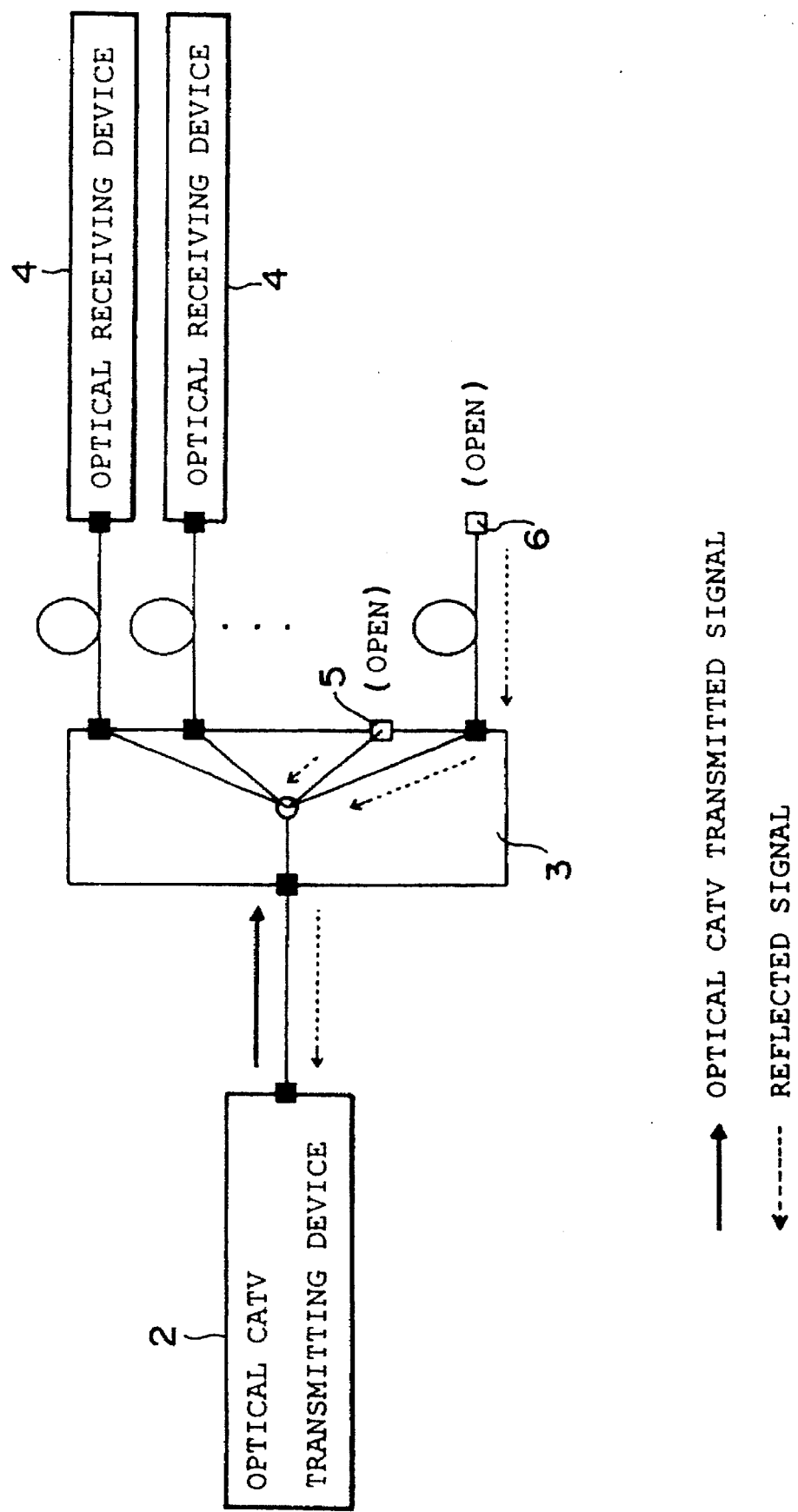

OPTICAL CONNECTOR OPTICAL ADAPTER AND LIGHT EMITTING MODULE

BACKGROUND OF THE INVENTION

1. Field of the Invention

The present invention relates to a reflection prevention type of optical connector.

2. Description of the Related Art

In recent years, an optical fiber is primarily used as a transmission line in the field of communications in response to an increase in transmission capacity. The connection of optical fibers is conventionally made by a splicing method such that the opposed end surfaces of the optical fibers are permanently connected together by splicing, or by a method using a detachable optical connector to connect the optical fibers together. In the latter method using the optical connector, it is required to reduce the misalignment of the optical fibers to less than about 1/10 of the core diameter of each fiber and also required to make good close contact of the opposed end surfaces of the optical fibers. Further, the demands on the optical connector are simple configuration, easy operation, and small connection loss.

Usually, the connection of optical fibers by the use of such an optical connector is carried out in the following manner. First, an optical connector is assembled by inserting and fixing in a centered ferrule a coupling end portion of an optical fiber to be connected, and then mounting the ferrule in a connector housing. Another optical connector is similarly assembled. Thereafter, the two optical connectors are inserted into an adapter from both ends thereof until the ferrules inserted in the connectors come to abutment against each other, thereby establishing the optical coupling between optical fibers.

In such a conventional optical connector, one ferrule is usually mounted in a housing, and the coupling end surface of the ferrule in the connector is generally adapted in polished condition to the coupling end surface of the ferrule in the other mating connector to be connected. Usually, the polished condition of the coupling end surface is spherical, and also in the following description, such a spherically polished condition of the coupling end surface will therefore be employed.

Conventional optical connectors with such structure pose two potential problems in operation. One problem is the radiation from the end surface of the connector when the connector is disconnected from the adaptor, which may cause damages of human eyes, depending on the radiated power, radiation angles, and accessibility to the connector end surface. Another is the reflection occurring at the end surface when the connector is open. Because of the refraction index difference, silica-air interface reflects about 5% of the transmitted light back to transmitter.

In SDH(Synchronous Digital Hierarchy) systems, those problems do not become serious, since in such systems optical output power is relatively low, and since they use the optical fiber for only one direction.

However, those two problems can become real problems in new systems; optical CATV systems or gigabit transmission systems which use optical amplifier, or bidirectional transmission system over single fiber.

First of the two problems will now be described with reference to FIG. 8.

A light signal transmitted from an optical CATV transmitting device 2 is branched by an optical star coupler 3 and is then received by optical receiver 4 on the subscribers side. However, if the optical branching device 3 has an open connector 5, or an optical connector 6 on any subscriber side is open, the light signal transmitted is reflected on the end surface of the connector 5 or 6 as shown by dotted arrows in FIG. 8. To prevent such reflection, unused connectors of the star coupler and/or the other end of the optical transmission line must be terminated properly.

In an optical CATV system using analog modulation, reflection at the open end surface degrades its transmission quality in that it increases distortion and lowers C/N ratio of the signal. In addition, the existence of reflection is likely to activate laser shutdown mechanism which detects open connector by reflection and shuts down the transmitter for laser hazard safety.

Activation of laser shutdown is good in itself in terms of operators' safety, but it at the same time means that all subscribers suffer the loss of signals.

SUMMARY OF THE INVENTION

It is therefore an object of the present invention to provide an optical connector which can drastically decrease the reflection that may occur at an end surface of a ferrule when the connector is left open.

It is another object of the present invention to provide an optical connector which can effectively suppress the radiation of a light signal from an end of the connector when the connector is left open.

In accordance with an aspect of the present invention, there is provided an optical connector comprising a housing; a first ferrule slidably stored in the housing, the first ferrule having one end polished so as to be adapted to a polished condition of a ferrule of a mating optical connector to be connected to the optical connector and having another end obliquely polished, the first ferrule having a center hole in which a first fiber is inserted and fixed; a second ferrule slidably stored in the housing, the second ferrule having one end obliquely polished and opposed to the other end of the first ferrule, the second ferrule having a center hole in which a second fiber is inserted and fixed so as to extend from another end of the second ferrule; a sleeve having one end portion in which the other end of the first ferrule is inserted and another end portion in which the one end of the second ferrule is inserted, the sleeve making alignment of the first fiber inserted in the first ferrule and the second fiber inserted in the second ferrule; a first spring for biasing the first ferrule and the second ferrule away from each other; and a second spring for biasing the second ferrule toward the first ferrule; the first spring having a spring constant greater than a spring constant of the second spring.

In accordance with another aspect of the present invention, there is provided an optical adapter comprising a first housing; a first ferrule slidably stored in the first housing, the first ferrule having one end polished so as to be adapted to a polished condition of a ferrule of a first optical connector to be connected to the optical adapter and having another end obliquely polished, the first ferrule having a center hole in which a first fiber is inserted and fixed; a second ferrule slidably stored in the first housing, the second ferrule having one end obliquely polished and opposed to the other end of the first ferrule and having another end polished so as to be adapted to a polished condition of a ferrule of a second optical connector to be connected to the optical adapter, the second ferrule having a center hole in which a second fiber is inserted and fixed; a first sleeve having one end portion in which the other end of the first ferrule is inserted and another end portion in which the one end of the second ferrule is inserted, the first sleeve making alignment of the first fiber inserted in the first ferrule and the second fiber inserted in the second ferrule; a second sleeve having one end portion in which the one end of the first ferrule is inserted; a third sleeve having one end portion in which the other end of the second ferrule is inserted; a first spring for biasing the first ferrule and the second ferrule away from each other; a second spring for biasing the first ferrule toward the second ferrule; a third spring for biasing the second ferrule toward the first ferrule; the first spring having a spring constant greater than a spring constant of each of the second and third springs; first holding means for removably holding the first optical connector inserted into another end portion of the second sleeve; and second holding means for removably holding the second optical connector inserted into another end portion of the third sleeve.

In actual use, the optical connector of the present invention is inserted into an adapter, and is connected to another usual optical connector. At this time, the first ferrule is pushed by the ferrule of the other optical connector against the biasing force of the first spring until the inclined other end of the first ferrule and the inclined one end of the second ferrule come into close contact with each other. As a result, a light signal is transmitted from the second ferrule to the first ferrule, and then transmitted to the other optical connector connected to the optical connector of the present invention.

When the optical connector of the present invention and the other optical connector are disconnected from each other, no external force is applied to the first ferrule, so that the first ferrule and the second ferrule are kept open by the biasing force of the first spring. As a result, the transmission of the light signal from the second ferrule to the first ferrule is cut off to thereby prevent the radiation of the light signal from the one end of the first ferrule, thus ensuring the safety of an operator.

Furthermore, in the open, or disconnected condition of the optical connector, the light signal transmitted through the second fiber in the second ferrule and reflected on the one end of the second ferrule is prevented from being returned to the transmitting side in spite of the condition where the first ferrule and the second ferrule are separated from each other, because the one end of the second ferrule is obliquely polished.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 8 is a schematic illustration of an optical CATV network.

DETAILED DESCRIPTION OF THE PREFERRED EMBODIMENTS

Figure 1:
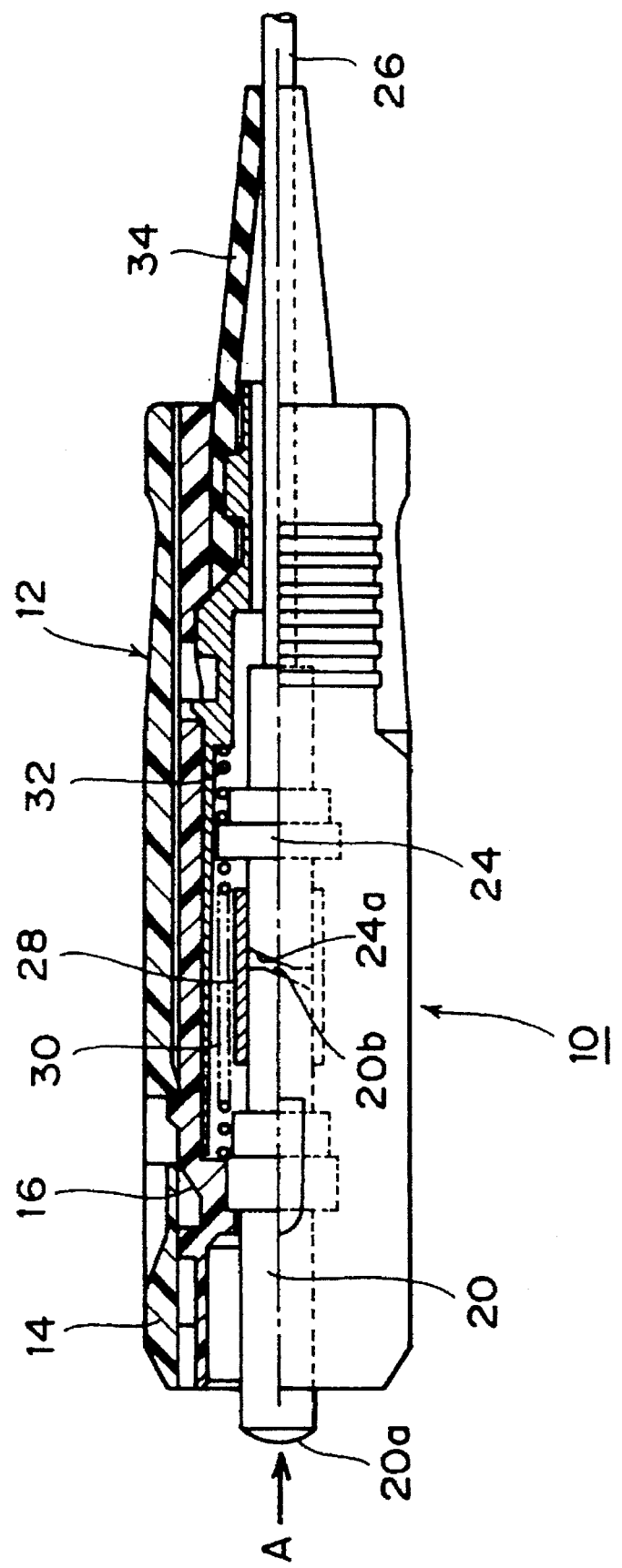
FIG. 1 is a partially sectional, side view of an optical connector according to a first preferred embodiment of the present invention in the open, or disconnected condition of the connector.
Figure 2:
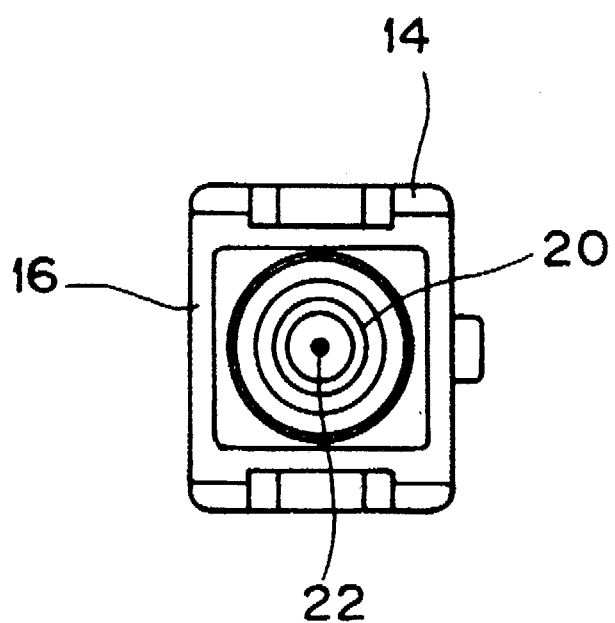
FIG. 2 is a view taken in the direction shown by an arrow A in FIG. 1.

Referring to FIG. 1, there is shown a partially sectional, side view of an optical connector 10 according to a first preferred embodiment of the present invention in the open condition of the connector 10, that is, in the condition where the optical connector 10 and a mating optical connector (not shown) are disconnected from each other. FIG. 2 is a view taken in the direction of an arrow A in FIG. 1. A housing 12 of the optical connector 10 includes a shell 14, a frame 16, and a stop ring 18 stored in the frame 16. The shell 14 and the frame 16 are formed of resin, and the stop ring 18 is formed of metal.

A first ferrule 20 and a second ferrule 24 are slidably stored in the housing 12. An optical fiber 22 is inserted and fixed in a center hole of the first ferrule 20. The first ferrule 20 has one end 20a spherically polished and another end 20b obliquely polished. An unsheathed portion of an optical fiber 26 is inserted and fixed in a center hole of the second ferrule 24. The second ferrule 24 has one end 24a obliquely polished at the same angle of inclination as that of the other end 20b of the first ferrule 20.

The other end 20b of the first ferrule 20 and the one end 24a of the second ferrule 24 are inserted in a split sleeve 28, thereby making alignment of the fiber 22 inserted in the first ferrule 20 and the fiber 26 inserted in the second ferrule 24. The first ferrule 20 and the second ferrule 24 are respectively provided with known rotation stops for allowing close contact of the inclined end surface 20b of the first ferrule 20 and the inclined end surface 24a of the second ferrule 24.

The first ferrule 20 and the second ferrule 24 are biased away from each other by a coil spring 30. Further, the second ferrule 24 is biased toward the first ferrule 20 by a coil spring 32. The coil spring 30 has a spring constant Ka and the coil spring 32 has a spring constant Kb, wherein the spring constant Ka of the coil spring 30 is greater than the spring constant Kb of the coil spring 32. Reference numeral 34 denotes a rubber bushing. In FIG. 1, a light signal is transmitted from the right to the left. In actual use, the optical connector 10 shown in FIG. 1 is inserted in a known adapter (not shown), in which the connector 10 is connected to another usual optical connector (not shown).

In the condition where the optical connector 10 is disconnected from the other optical connector as shown in FIG. 1, no external force is applied to the first ferrule 20, so that the first ferrule 20 and the second ferrule 224 are kept separate from each other by the biasing force of the coil spring 30. Accordingly, the light signal transmitted through the optical fiber 26 inserted in the second ferrule 24 is not coupled with the optical fiber 22 inserted in the first ferrule 20 to thereby prevent the radiation of the light beam from the one end 20a of the first ferrule 20, thus ensuring the safety of an operator.

Further, since the one end 24a of the second ferrule 24 is obliquely polished, the light transmitted through the optical fiber 26 and reflected on the inclined end surface 24a of the second ferrule 24 is not returned to the transmitting side even in the separate condition of the first ferrule 20 and the second ferrule 24. Accordingly, other subscribers are not adversely affected in a communication system having such a network form as shown in FIG. 8.

Figure 3:
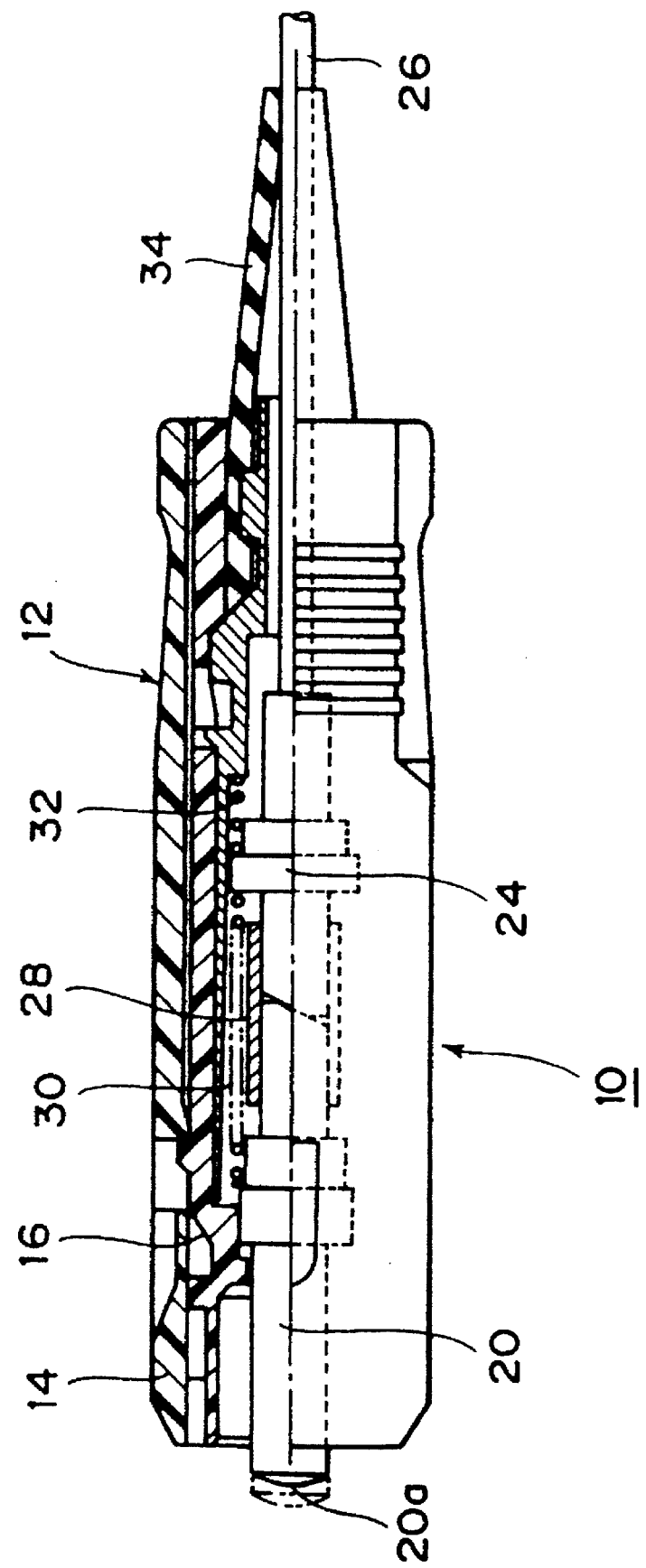
FIG. 3 is a view similar to FIG. 1, showing the closed, or connected condition of the connector.

FIG. 3 shows a partially sectional, side view of the optical connector 10 in the condition where the optical connector 10 is inserted in an adapter (not shown) and connected to another usual optical connector (not shown). In this condition, the first ferrule 20 is pushed by a ferrule of the other optical connector mating with the optical connector 10 in an opposed manner to move rightward from the position shown by a phantom line in FIG. 3. As a result, both the coil springs 30 and 32 are compressed. However, since the spring constant Ka of the coil spring 30 is greater than the spring constant Kb of the coil spring 32, enough contact between the first ferrule 20 and the ferrule of the other connector is first made, and the inclined end surfaces of the first ferrule 20 and the second ferrule 24 next come into contact with each other.

In this condition, a light signal transmitted through the optical fiber 26 in the second ferrule 24 is coupled with the optical fiber 22 in the first ferrule 20, because the fiber 22 in the first ferrule 20 and the fiber 26 in the second ferrule 24 are coaxially held by the split sleeve 28. This light signal is then coupled with an optical fiber inserted in the ferrule of the other optical connector.

Figure 4:
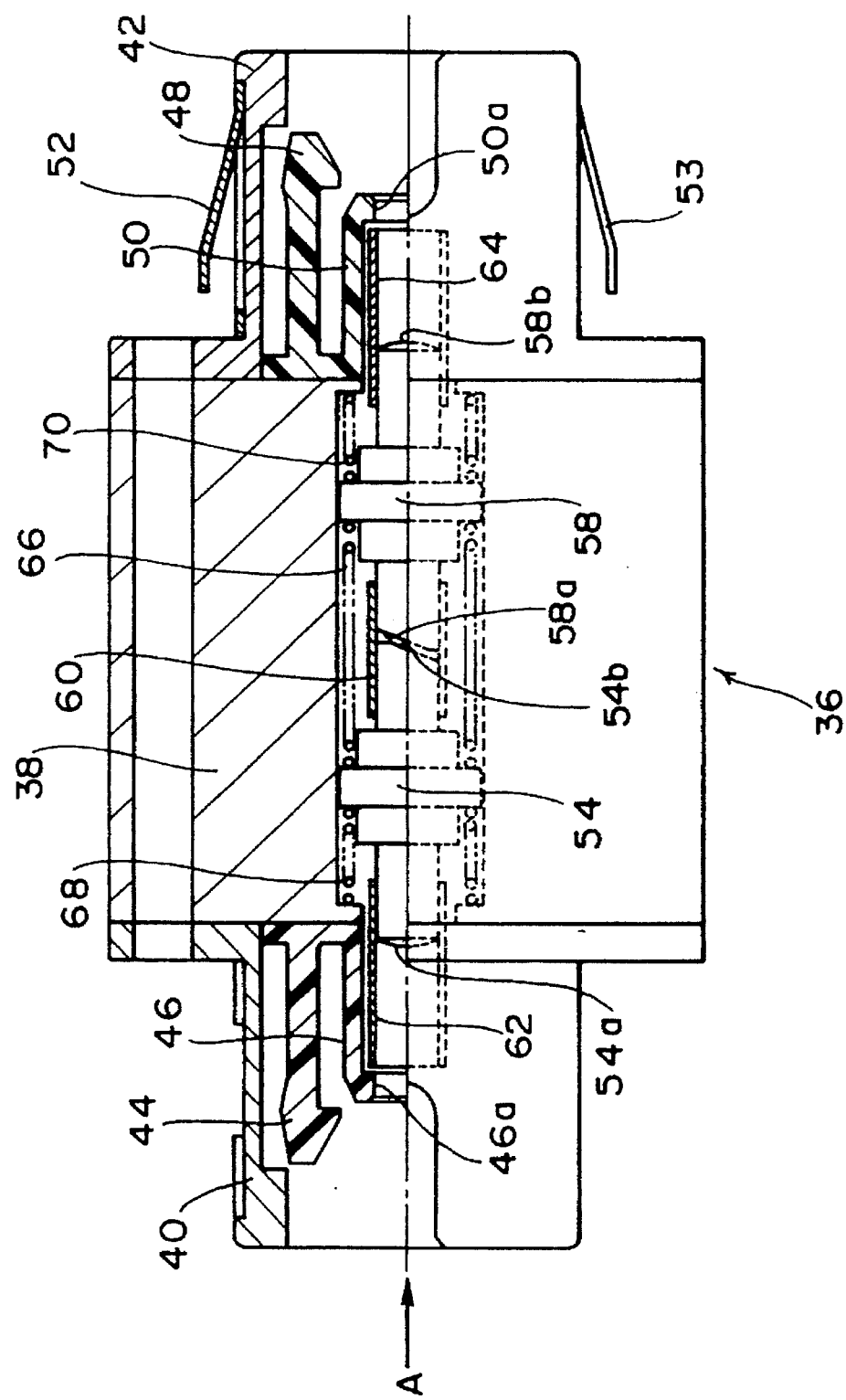
FIG. 4 is a partially sectional, side view of an optical adapter according to a second preferred embodiment of the present invention.

Referring to FIG. 4, there is shown a partially sectional, side view of an optical adapter 36 according to a second preferred embodiment of the present invention, applying the principle of the first preferred embodiment mentioned above. The optical adapter 36 has a first housing 38, a second housing 40, and a third housing 42. The second and third housings 40 and 42 are fixed by spot welding to both end surfaces of the first housing 38. Further, annular holders 46 and 50 having hooks 44 and 48, respectively, are bonded to both end surfaces of the first housing 38. The holders 46 and 50 have circular openings 46a and 50a, respectively. Fixing springs 52 and 53 are mounted on the third housing 42.

Figure 5:
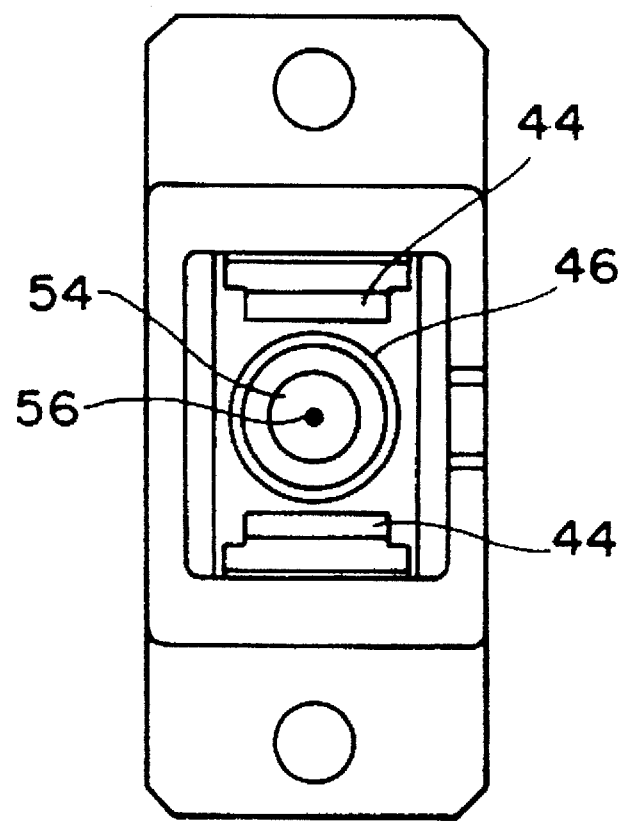
FIG. 5 is a view taken in the direction shown by an arrow A in FIG. 4.

A first ferrule 54 and a second ferrule 58 are slidably stored in the first housing 38. As shown in FIG. 5, an optical fiber 56 is inserted and fixed in a center hole of the first ferrule 54. Similarly, an optical fiber (not shown) is inserted and fixed in a center hole of the second ferrule 58. The first ferrule 54 has one end 54a spherically polished and another end 54b obliquely polished. On the other hand, the second ferrule 58 has one end 58a obliquely polished at the same angle of inclination as that of the other end 54b of the first ferrule 54, and has another end 58b spherically polished.

The other end 54b of the first ferrule 54 and the one end 58a of the second ferrule 58 are inserted in a split sleeve 60. The one end 54a of the first ferrule 54 is inserted in a split sleeve 62 stored in the holder 46. The other end 58b of the second ferrule 58 is inserted in a split sleeve 64 stored in the holder 50. The first ferrule 54 and the second ferrule 58 are biased away from each other by a coil spring 66. Further, the first ferrule 54 is biased toward the second ferrule 58 by a coil spring 68, and the second ferrule 58 is biased toward the first ferrule 54 by a coil spring 70.

The coil spring 66 has a spring constant Ka, and each of the coil springs 68 and 70 has a spring constant Kb. That is, the spring constant of the coil spring 68 is the same as that of the coil spring 70. The spring constant Ka of the coil spring 66 is greater than the spring constant Kb of each of the coil springs 68 and 70. In actual use, two connector plugs (not shown) are inserted into the optical adapter 36 from both ends thereof, and are securely held by the hooks 44 and 48, respectively. As a result, the first ferrule 54 and the second ferrule 58 are pushed toward each other by the connector plugs until the inclined end surfaces 54b and 58a come into contact with each other to couple the optical fibers inserted in the ferrules 54 and 58.

When one of the two connector plugs is in disconnection from the adapter 36, the inclined end surface 54b of the first ferrule 54 and the inclined end surface 58a of the second ferrule 58 are kept separate from each other as shown in FIG. 4, because the spring constant Ka of the coil spring 60 is greater than the spring constant Kb of each of the coil springs 68 and 70. Accordingly, the reflection and radiation of a light signal on and from the end surfaces of the ferrules can be suppressed in accordance with the principle of operation as described in the first preferred embodiment.

Figure 6:
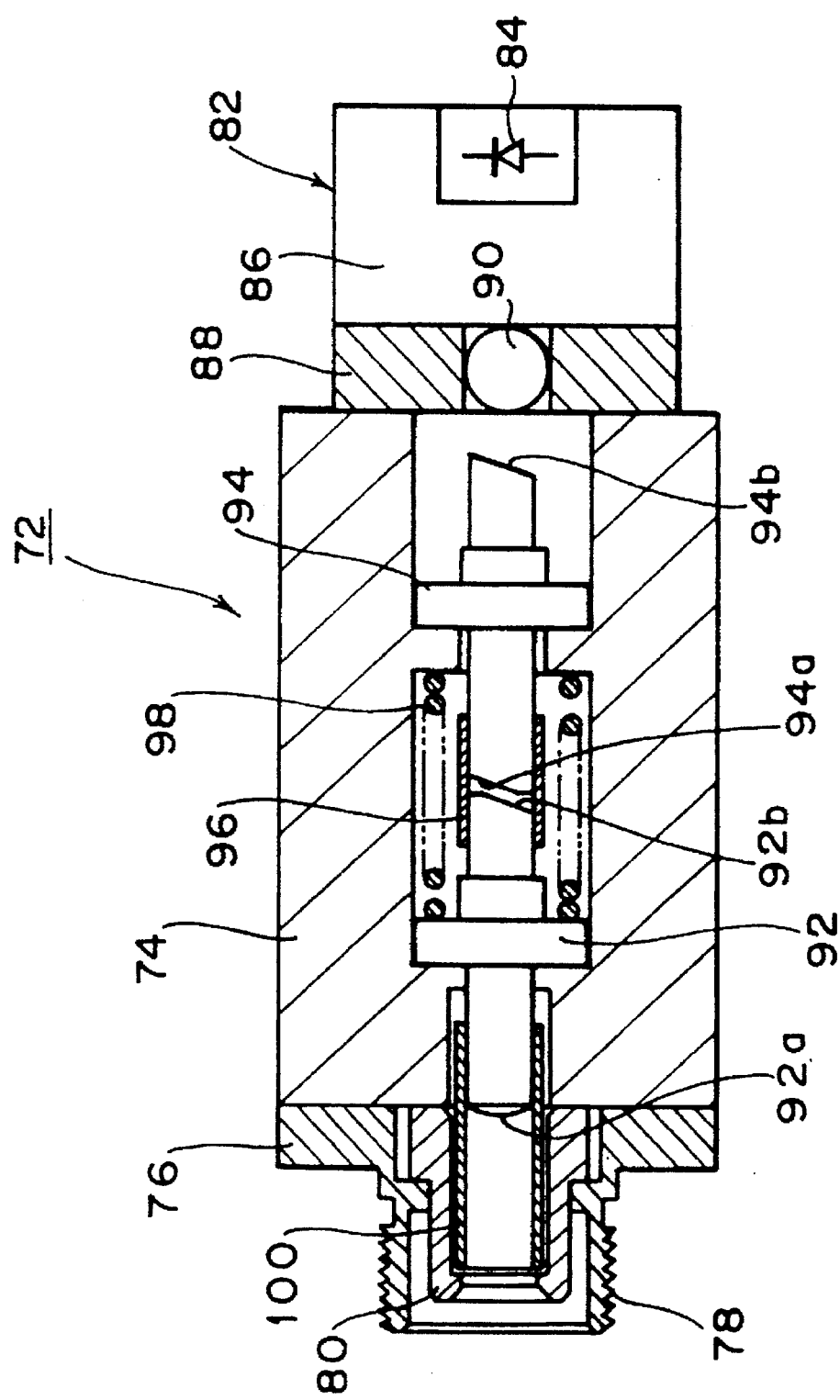
FIG. 6 is a sectional view of a light emitting module according to a third preferred embodiment of the present invention.

Referring to FIG. 6, there is shown a sectional view of a light emitting module 72 according to a third preferred embodiment of the present invention, applying the principle of the present invention. The light emitting module 72 has a housing 74. A receptacle 76 is fixed by spot welding to one end of the housing 74. The receptacle 76 has external screw threads 78. A light emitting device assembly 82 is fixed by spot welding to the other end of the housing 74. The light emitting device assembly 82 includes a package 86 storing a light emitting device 84 such as a laser diode and a lend holder 88 securely holding a spherical lens 90.

A first ferrule 92 is slidably stored in the housing 74. Further, a second ferrule 94 is stored in the housing 74 and is fixed to the housing 74 by spot welding or the like. Optical fibers (not shown) are respectively inserted and fixed in center holes of the first ferrule 92 and the second ferrule 94. The first ferrule 92 has one end 92a spherically polished and another end 92b obliquely polished. On the other hand, the second ferrule 94 has one end 94a obliquely polished at the same angle of inclination as that of the other end 92b of the first ferrule 92, and has another end 94b obliquely polished.

The other end 92b of the first ferrule 92 and the one end 94a of the second ferrule 94 are inserted in a split sleeve 96. The first ferrule 92 is biased away from the second ferrule 94 by a coil spring 98. A holder 80 is stored in the receptacle 76 and is fixed to the one end of the housing 84 by spot welding or the like. The one end 92a of the first ferrule 92 is inserted in a split sleeve 100 stored in the holder 80.

In the condition where a connector plug (not shown) is not engaged with the receptacle 76 as shown in FIG. 6, the first ferrule 92 is kept separate from the second ferrule 94. Accordingly, the radiation of a light signal from the light emitting module 72 can be prevented. Furthermore, it is possible to prevent the light reflected on the inclined end surfaces 94a and 94b of the second ferrule 94 may be returned to the light emitting device 84. Accordingly, the operation of the light emitting device 84 can be stabilized.

Figure 7:
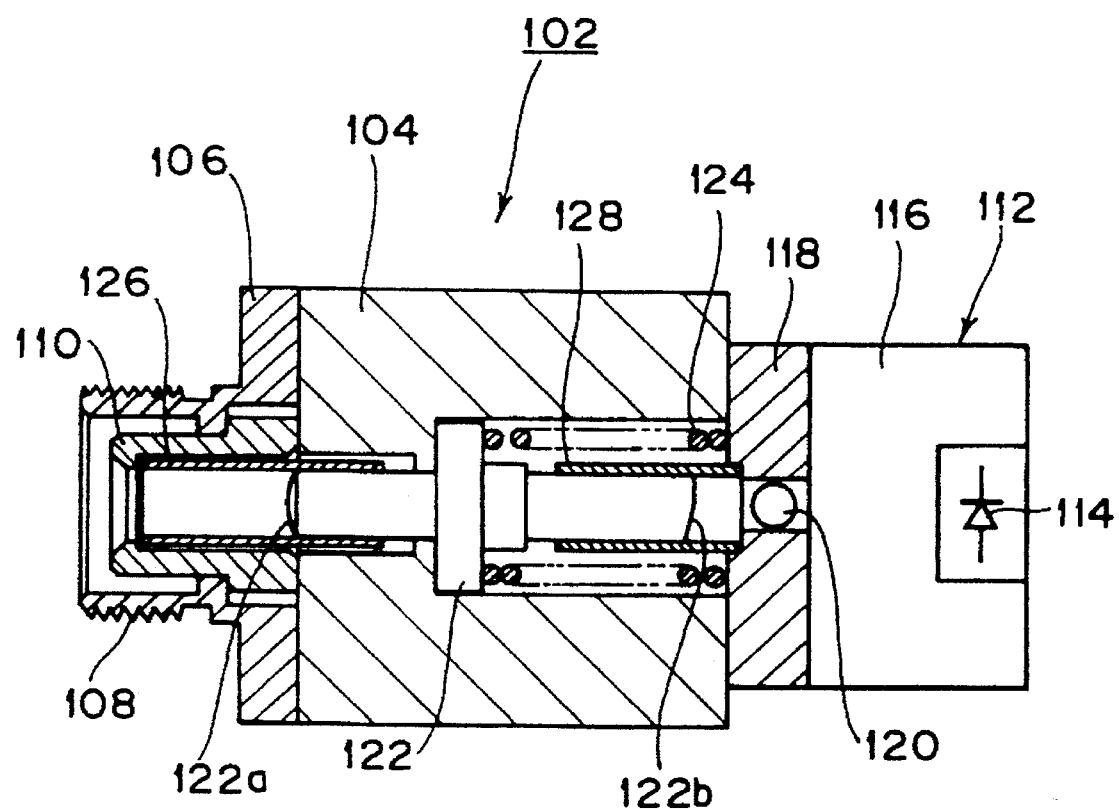
FIG. 7 is a sectional view of a light emitting module according to a fourth preferred embodiment of the present invention.

Referring to FIG. 7, there is shown a sectional view of a light emitting module 102 according to a fourth preferred embodiment of the present invention. The light emitting module 102 has a housing 104. A receptacle 106 is fixed by spot welding to one end of the housing 104. The receptacle 106 has external screw threads 108. Further, a holder 110 is stored in the receptacle 106 and is fixed by spot welding to the one end of the housing 104. A light emitting device assembly 112 is fixed to the other end of the housing 104 by laser welding or the like. The light emitting device assembly 112 includes a package 116 storing a light emitting device 114 such as a laser diode and a lens holder 118 storing a spherical lens 120.

A ferrule 122 is slidably stored in the housing 104. An optical fiber (not shown) is inserted and fixed in a center hole of the ferrule 122. The ferrule 122 has one end 122a spherically polished and another end 122b obliquely polished. The ferrule 122 is biased leftward as viewed in FIG. 7 by a coil spring 124. The one end 122a of the ferrule 122 is inserted in a split sleeve 126 stored in the holder 110, and the other end 122b of the ferrule 122 is inserted in a precision sleeve 128 fixed to the lens holder 118.

In the condition where a connector plug (not shown) is not engaged with the receptacle 106 as shown in FIG. 7, the ferrule 122 is offset from an optimum coupling position of a light signal emitted from the light emitting device 114 by the biasing force of the coil spring 124. Accordingly, a coupling loss can be greatly increased to thereby prevent the radiation of the light beam from the light emitting module 102. When the connector plug is engaged with the receptacle 106, the ferrule 122 is pushed rightward as viewed in FIG. 7 by a ferrule of the connector plug to move to the optimum coupling position. Accordingly, an optical signal from the light emitting device 114 can be coupled to the optical fiber in the ferrule 122 with a minimum coupling loss.

It is necessary to adapt the manner of polishing of the end surface of the ferrule in the optical connector and the adapter of the present invention to the manner of polishing the end surface of the ferrule in a mating connector to be connected, from the viewpoint of properties of the optical connector and the adapter. The amount of suppression of light reflection in the connected condition of the connector/adapter of the present invention and the mating connector is dependent on the manner of polishing. Accordingly, in such an application that reflected light is not desired, low reflection is adopted as the manner of polishing in the ferrule of the mating connector, and the manner of polishing in the ferrule of the connector/adapter of the present invention is adapted to the above low-reflection polishing manner of the mating connector, thereby suppressing the light reflection both in the disconnected condition and in the connected condition.

According to the optical connector of the present invention, it is possible to effectively prevent that light reflected on an end surface of the ferrule built in the optical connector may be returned to a transmitting side in the open condition of the connector. Further, it is also possible to effectively suppress the radiation of a light beam from an end of the connector in the open condition of the connector. The present invention can further provide an optical adapter and a light emitting module both having effects similar to those of the optical connector mentioned above.

What is claimed is:

1. An optical connector comprising:

a housing;

a first ferrule slidably stored in said housing, said first ferrule having one end polished so as to be adapted to a polished condition of a ferrule of a mating optical connector to be connected to said optical connector and having another end obliquely polished, said first ferrule having a center hole in which a first fiber is inserted and fixed;

a second ferrule slidably stored in said housing, said second ferrule having one end obliquely polished and opposed to the another end of said first ferrule, said second ferrule having a center hole in which a second fiber is inserted and fixed so as to extend from another end of said second ferrule;

a sleeve having one end portion in which the another end of said first ferrule is inserted and another end portion in which the one end of said second ferrule is inserted, said sleeve making alignment of said first fiber inserted in said first ferrule and said second fiber inserted in said second ferrule;

a first spring for biasing said first ferrule and said second ferrule away from each other; and a second spring for biasing said second ferrule toward said first ferrule, said first spring having a spring constant greater than a spring constant of said second spring.

2. An optical connector according to claim 1, wherein said sleeve is a split sleeve.

3. An optical adapter comprising:

a first housing;

a first ferrule slidably stored in said first housing, said first ferrule having one end polished so as to be adapted to a polished condition of a ferrule of a first optical connector to be connected to said optical adapter and having another end obliquely polished, said first ferrule having a center hole in which a first fiber is inserted and fixed;

a second ferrule slidably stored in said first housing, said second ferrule having one end obliquely polished and opposed to the another end of said first ferrule and having another end polished so as to be adapted to a polished condition of a ferrule of a second optical connector to be connected to said optical adapter, said second ferrule having a center hole in which a second fiber is inserted and fixed;

a first sleeve having one end portion in which the another end of said first ferrule is inserted and another end portion in which the one end of said second ferrule is inserted, said first sleeve making alignment of said first fiber inserted in said first ferrule and said second fiber inserted in said second ferrule;

a second sleeve having one end portion in which the one end of said first ferrule is inserted;

a third sleeve having one end portion in which the another end of said second ferrule is inserted;

a first spring for biasing said first ferrule and said second ferrule away from each other;

a second spring for biasing said first ferrule toward said second ferrule;

a third spring for biasing said second ferrule toward said first ferrule;

said first spring having a spring constant greater than a spring constant of each of said second and third springs;

first holding means for removably holding said first optical connector inserted into another end portion of said second sleeve; and second holding means for removably holding said second optical connector inserted into another end portion of said third sleeve.

4. An optical adapter according to claim 3, further comprising:

a second housing fixed to one end of said first housing; and a third housing fixed to another end of said first housing;

wherein said first holding means comprises a first hook member stored in said second housing, and said second holding means comprises a second hook member stored in said third housing.

5. A light emitting module comprising:

a housing;

a first ferrule slidably stored in said housing, said first ferrule having one end polished so as to be adapted to a polished condition of a ferrule of a mating optical connector to be connected to said light emitting module and having another end obliquely polished, said first ferrule having a center hole in which a first fiber is inserted and fixed;

a second ferrule fixed in said housing, said second ferrule having one end obliquely polished and opposed to the another end of said first ferrule, said second ferrule having a center hole in which a second fiber is inserted and fixed;

a first sleeve having one end portion in which the another end of said first ferrule is inserted and another end portion in which the one end of said second ferrule is inserted, said sleeve making alignment of said first fiber inserted in said first ferrule and said second fiber inserted in said second ferrule;

a spring for biasing said first ferrule away from said second ferrule;

a second sleeve having one end portion in which the one end of said first ferrule is inserted;

a receptacle fixed to one end of said housing; and a light emitting device assembly fixed to another end of said housing, said light emitting device assembly having a light emitting device and a lens for coupling a light beam emitted from said light emitting device to said second fiber inserted in said second ferrule.

6. A light emitting module according to claim 5, wherein said first and second sleeves are split sleeves.

7. A light emitting module comprising:

a housing;

a ferrule slidably inserted in said housing, said ferrule having one end polished so as to be adapted to a polished condition of a ferrule of a mating optical connector to be connected to said light emitting module and having another end obliquely polished, said ferrule having a center hole in which a fiber is inserted and fixed;

a first sleeve having one end portion in which the one end of said ferrule of said module is inserted;

a receptacle fixed to one end of said housing;

a light emitting device assembly fixed to another end of said housing, said light emitting device assembly having a light emitting device and a lens for coupling a light beam emitted from said light emitting device to said fiber inserted in said ferrule of said module;

a second sleeve having one end portion in which the another end of said ferrule of said module is inserted, said second sleeve making alignment of said fiber inserted in said ferrule of said module and a center of said lens; and a spring for biasing said ferrule of said module so as to offset the same from an optimum coupling position of said light beam emitted from said light emitting device;

wherein when said ferrule of said mating optical connector is inserted into another end portion of said first sleeve, said ferrule of said module is pushed by said ferrule of said mating optical connector to move to said optimum coupling position of said light beam emitted from said light emitting device against a biasing force of said spring.

8. A light emitting module according to claim 7, wherein said first sleeve is a split sleeve.

* * * * *